United States Patent [19]

Craig

[11] 3,841,929

[45] Oct. 15, 1974

[54] SOLID PROPELLANT CONTAINING STRONTIUM CARBONATE-CALCIUM CITRATE BURNING RATE DEPRESSANT

[75] Inventor: John M. Craig, Waco, Tex.

[73] Assignee: Rockwell International Corporation, El Segundo, Calif.

[22] Filed: July 12, 1963

[21] Appl. No.: 294,812

[52] U.S. Cl.................... 149/17, 149/18, 149/19, 149/20
[51] Int. Cl.............................................. C06d 5/06
[58] Field of Search .................... 149/17, 18, 19, 20

[56] References Cited
UNITED STATES PATENTS 2,904,420   9/1959   Holker ............................ 149/61 X Primary Examiner—Benjamin R. Padgett
Attorney, Agent, or Firm—Robert M. Sperry

EXEMPLARY CLAIM

1. A solid propellant matrix having therein the combination of calcium citrate and strontium carbonate in sufficient quantity to reduce the burning rate of the propellant.

9 Claims, 1 Drawing Figure

- - - - CALCIUM CITRATE
— - — STRONTIUM CARBONATE
——— COMBINATION

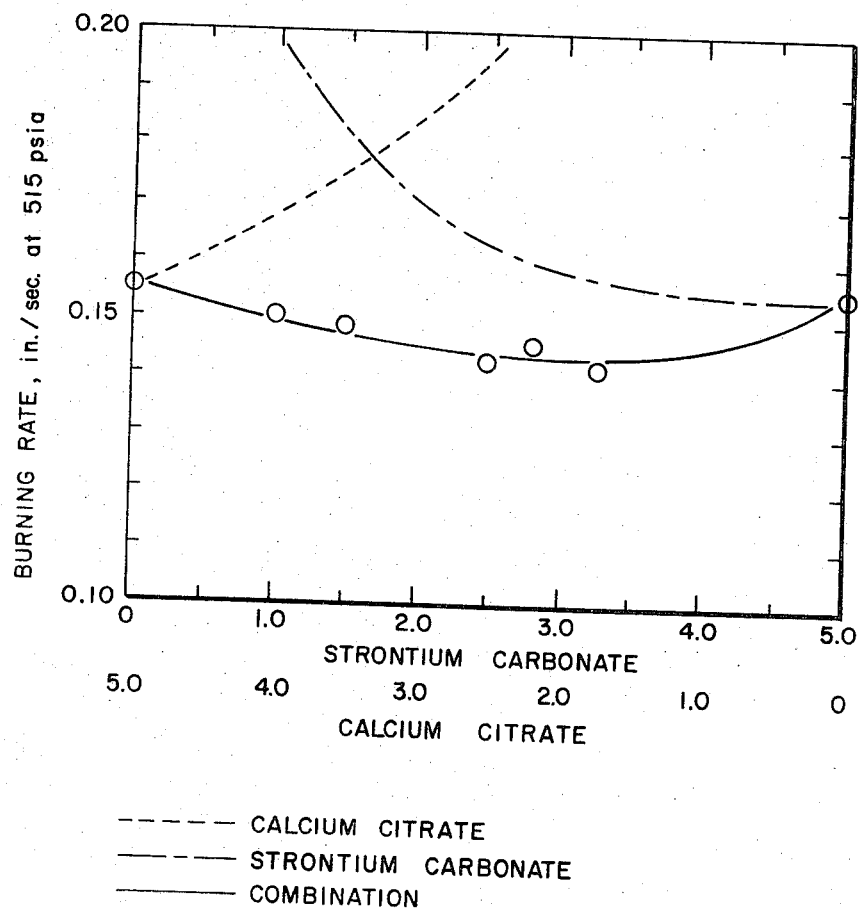

SOLID PROPELLANT CONTAINING STRONTIUM CARBONATE-CALCIUM CITRATE BURNING RATE DEPRESSANT

Control over combustion pressure in a solid propellant rocket motor and associated thrust-time and thrust-to-weight ratio characteristics has been a major area of concern since the beginnings of study of solid propellant rocketry. During the time of development in the field, a few basic grain designs have evolved: the end burner, the case-bonded ported grain and internally-supported grains. Numerous variations of these particular configurations have been developed with various types of internal star point configurations, combinations of fast and slow-burning propellants and the like. These have been used by the grain designers to achieve control over the flight characteristics of the missiles.

Generally, the design objective is to provide an initial combustion surface within the solid propellant grain with the geometric property of constant or decreasing burning areas as increments of propellant are burned out in successive time intervals. Although each new missile usually requires a unique grain design, a neutral (constant pressure) or regressive (decreasing pressure) combustion pressure-time characteristic is required in nearly every grain design.

However, the most important criteria which the performance of a rocket engine is measured is that of specific impulse, $I_s$, which is the thrust divided by the weight flow rate of propellant and which usually is expressed in seconds. The impulse of a solid propellant rocket engine is directly proportional to the log of the chamber pressure. The integral of engine thrust over the total time the propellant burns is the total impulse, $I_t$. In theory a given weight of propellant might be expected to deliver the same total impulse whether combustion is carried out over a longer time at low pressure or a shorter time at high pressure. However, it is an observed fact that combustion at higher pressure is advantageous in obtaining appreciably more total impulse or useful energy from a given weight of propellants. The phenomena responsible for this are not completely understood but probably relates to more efficient combustion conditions in a thin principal flame reaction zone which moves closer to the surface of the propellant at higher pressure. However, it is difficult to obtain more initial burning area than the surface area presented by the case of the motor near burn-out. This is indicated by the complex shapes of mandrels that are used to form the combustion cavity in various model cast propellant rockets.

Once the initial internal combustion surface of a solid propellant rocket motor has been designed to provide as large a surface as possible and thus as large chamber pressure as possible, difficulties are presented in obtaining highly-regressive pressure-time characteristics. Since it is difficult to obtain a ratio of higher initial surface to lower burn-out surface, regressive pressure characteristics are not readily achieved. Since most grains have a progressive increase in chamber pressure due to increased burning surface or at best a slight decrease in pressure in complicated designed grains, a high strength case is needed to prevent the grain from exploding due to the burn-out pressures. The best cast propellant grain configurations can provide only 13 to about 20 percent decrease in the initial combustion pressure without leaving excessive slivers of unburned propellant or suffering inefficient volume loading. Large or medium size rocket motors are seldom designed to operate at 1,000 psi or higher combustion pressures, because of the penalty in case weight to sustain such higher pressures. Even though combustion efficiency increases at high pressures, the weight penalty inherent in motor cases designed to withstand such pressures higher than 1,000 psi becomes prohibitive. It thus becomes apparent that in order to have initial high chamber pressure with the attendant high specific impulse it is imperative that the engine have a high regressivity such that the pressure at a subsequent elapsed time is substantially lower than that at the initial firing conditions so that a lightweight casing may be used with the motor not effecting any weight penalty.

It is an object of this invention to provide a highly-regressive burning solid propellant rocket motor.

An additional object of this invention is to provide a low burning rate solid propellant composition.

Another object of this invention is to provide a solid propellant motor having high specific impulse and high regressivity.

A further object of this invention is to provide a solid propellant rocket motor having a low motor case weight at low burn-out pressures.

The herein invention comprises the addition of the compound selected from the class consisting of strontium carbonate or calcium citrate or a combination of both to a solid propellant matrix to effectively reduce the burning rate thereof. For example, an addition of strontium carbonate to a solid propellant was found to decrease the burning rate from 0.37 to 0.18 inches per minute at 1,000 psi. The strontium carbonate was incorporated in the propellant at three percent the total weight of the matrix. The most effective improvement in the control of the burning rate of the propellant matrix has been found when the compounds are added at a level 0.5 to 9 percent by weight of the matrix. When both additives are used in combination it is preferred that they be present in the amount of 4 to 6 weight percent of the matrix composition. The amount of each compound in the combination may vary but particularly good results are obtained when the strontium carbonate is from 55 to 70 weight percent of the combination. When strontium carbonate is used alone it is preferred that it be present in the amount of 2 to 3.5 weight percent of the matrix composition. When calcium citrate is the additive, it is preferred that it is from 4 to 5.5 weight percent of the matrix.

Though in some applications it might be desirable to have a solid propellant grain having a substantially lower burning rate throughout its entire duration of burning, the particular applicability of the compositions of this invention lie in the utilization of the material in combination with higher burning matrixes within a given grain as will be explained. In most applications it is desirable to have a high burning rate propellant for the major duration of the burning. As a result, the ideal configuration embraces the utilization of such a high burning rate grain surrounded with a layer of a lower burning rate composition adjacent the outer casing. This would then provide for a substantial reduction in the burning rate immediately adjacent the casing so that a lighter casing could be utilized due to the lower pressures that are adjacent the casing. Present casting techniques would not enable one to fabricate such a grain since it would necessitate casting of various layers of propellant. The type of grains and fabrication described in co-pending applications Ser. Nos. 144,265, filed Oct. 10, 1961 and 179,446, filed Mar. 19, 1962, now U.S. Pat. No. 3,518,916, is particularly adaptable to the utilization of the compositions of this invention. The co-pending applications describe a solid propellant grain and a method of manufacturing wherein the grain is reinforced by winding fine filament material together on a mandrel with a matrix of oxidizer in an organic binder. This filament is not parallel to any plane of symmetry in the matrix. The filaments utilized are normally metallic wires selected from a class consisting of the metals of Group II-A through Group IV-A, Group I-B through Group VII-B and Group VIII of the Periodic Table. Aluminum and beryllium wires have been found to be particularly advantageous. While the grain is being fabricated about a mandrel utilizing the process described, the matrix added to the mandrel during the fabrication thereof may vary in composition. Thus, the outer or final layer of the grain being fabricated may have a matrix composition which has a lower burning rate than the rest of the propellant.

In addition to the above described application of the strontium carbonate or calcium citrate or combination of both when combined with the reinforced grain, another important application should be apparent. For some missile applications it is particularly desirable that the missile be of relative light weight. Missiles launched from aircraft fall into such a category. In order for the missiles to be of such light weight, the amount of propellant within the missile would inherently have to be reduced. Thus, for long range applications the burning rate of the entire solid propellant grain would desirably be reduced. To accomplish this, the additives of the invention would be incorporated throughout an entire reinforced grain or throughout the entire matrix of the conventional solid propellant grain so that the grain will have a low burning rate from its initial burning until the burn-out condition is reached. This will provide for relatively long range missile application.

It is believed that the improved affect of the burning rate additives in the solid propellant matrix will be shown from the following detailed examples and the figure representing the plot of the burning rate versus the additive content of the additives disclosing the synergism in using both additives together.

A solid propellant is normally comprised of a matrix having a binder and oxidizer. Within this matrix is usually provided the fuel which is of a metal.

The matrix of solid decomposable material employed in preparing the solid grain of the invention may be a compacted particulate inorganic material serving as a fuel or an organic binder or a combination of these. The matrix may also contain the oxidizer employed to burn the binder and fuel in producing thrust. Inorganic materials which may serve as the matrix include the metal hydrides such as lithium hydride.

The oxidizable polymeric material employed in the preparation of the reinforced compositions of this invention can be any organic polymer whether naturally occurring or synthetically prepared. Thus, thermoplastic, thermosetting, elastomeric, polymeric, and plastic materials of any description may be employed. These materials may be either naturally occurring, modified materials occurring in nature, or synthetically prepared.

Among the thermoplastic materials which may be employed are polymers and copolymers of mono-olefinic hydrocarbon having at least two carbon atoms. Thus, the polymers and copolymers of ethylene, propylene, various butenes, pentenes, and hexenes, as well as the halogenated counterparts of these olefins may be employed in the practice of this invention. Among the thermosetting polymeric materials which may be employed are those plastics and resins which cure to a solid upon the application of heat with or without a chemical curing agent. Illustrative examples of this class of material include the polyurethane resins, epoxide resins, polyester materials, and di-(thioalkoxy) methylene polymers (polysulfide polymers). In addition, elastomers, such as the natural and synthetic rubbers, may be practicably and profitably employed in the practice of this invention. The synthetic rubbers are ordinary polymers and copolymers of a diolefin (as a major constituent) with other olefin constituents and which are subject to vulcanization with sulfur subsequent to polymerization to cross-link the polymer through any remaining carbon-to-carbon double bonds. In addition to the above, organic polymers derived from naturally occurring non-elastomeric polymeric materials may be employed in the practice of this invention.

In general, carbohydrate condensation-type polymers, amino-acid condensation polymers, synthetic linear condensation polymers including the polyamides and polyesters, linear addition polymers such as hydrocarbon and vinyl-type polymers, and cross-linking polymers may be employed to prepare the products of this invention.

The condensation-type polymers are cellulose, cellulose nitrate, cellulose acetate, cellulose acetate-butyrate, ethylcellulose, and the cellulose ethers such as methyl carboxymethyl, hydroxyethyl, cyanoethyl and benzyl cellulose.

Examples of the amino-acid condensation polymers are regenerated proteins such as casein and vegetable globulins. Synthetic linear condensation polymers which may be employed in the practice of this invention include the polyamides such as nylon, and polyurethane resins, polyesters such as the alkyd and fiber-forming types, polyester and polyesteramide rubbers.

Applicable linear addition polymers include natural and vulcanized rubbers such as gutta-percha, balata, and chicle, cyclized or isomerized rubber, rubber hydrochloride, polybutadiene rubbers including GR-S and nitrile rubber, polychloroprene and its copolymers, polysulphide rubbers, polyisobutylene and the butyl rubbers, the various polyethylenes including chlorosulphonated polyethylene rubber, polytetrafluorethylene, polystyrene, polyvinylcarbazole and polyacenaphthylene, indene and coumarone-indene resins, polyvinyl acetate, polyvinyl alcohol, polyvinyl pyrrolidone, polyvinyl formal, polyvinyl acetal, and polyvinyl butyral, polyvinyl chloride, vinyl chloride-vinyl acetate copolymers, polyacrylonitrile, vinyl chlorideacrylonitrile copolymers, polyvinylidene chloride and its copolymers, polymethyl methacrylate and related polyacrylates, ketone aldehyde polymers and polyacrylate rubbers. Particularly preferred is carboxyterminated linear polybutadiene known as Butarez CTL made by Phillips Petroleum Co.

Cross-linking polymers applicable to the present invention include cross-linking type polyester resins, various epoxy resins, polymerized drying oils, aniline formaldehyde resins, sulphonamideformaldehyde resins, urea-formaldehyde resins, melamine-formaldehyde resins, and the various phenol-formaldehyde condensation resins.

Furthermore, organic polymers containing elements other than carbon, hydrogen, oxygen, and nitrogen may be employed. For example, silicon-containing polymeric materials are advantageously adapted to the practice of this invention. The silicon-containing polymers fall into two general classes; that is, those having direct silicon-to-carbon bonds (the silanes) and those having silicon-bonded to carbon through oxygen (the siloxanes). The silicon-containing materials often have a halogen in the molecule.

It is often advisable to employ plasticizers in the preparation and utilization of the polymeric and plastimeric materials employed in the invention. These plasticizers may be of the general type, inert plasticizers and explosive plasticizers. Examples of inert plasticizers include triacetin, the various phthalates such as diethyl phthalate, dibutyl phthalate, dioctyl phthalate, di-(methoxyethyl) phthalate, methyl phthalyl ethyl glycolate, ethyl phthalyl ethyl glycolate and butyl phthalyl butyl glycolate, sebacates such as dibutyl and dicotyl sebacates, adipates such as dioctyl adipate and di(3,5,-5-trimethylhexyl)adipate, glycol esters of higher fatty acids, organic phosphate esters such as tributoxyethyl phosphate, and the like. The explosive plasticizers include nitroglycerin, butane triol trinitrate, diglycol dinitrate, ethylene glycol dinitrate, and the like.

The solid material which may be dispersed throughout the polymer matrix is usually in finely divided form having a particle size ranging from about 1–500 microns or greater in diameter. When the composition is intended as a solid propellant grain, it is often desirable to employ a combination of two or more different particle size ranges. For example, solid propellants are prepared in which the finer material comprises a fine particle size range of from 1 to about 75 microns and a coarse range of from about 75 to 500. However, particles of any size within the range of 1–500 microns may be employed without regard to particle size. This gives desirable burning rates to the propellant. The particle size ranges may be adjusted depending upon the particular binder-fuel-oxidizer combination employed and the specific impulse desired.

The solid substances with which the polymeric materials are loaded may be inert pigments such as titanium dioxide, lead oxide, ferric oxide, carbon black, powdered metals and alloys, metal fluorides, asbestos fibers, etc.

When the solids are oxidizing agents, they can be compounds such as metal perchlorates and metal nitrates. The metal perchlorates employed as oxidizing agents or oxygen carriers in the compositions are anhydrous and have the general formula $M(ClO_4)_x$, wherein M is $NH_4$ or a metal and $x$ is the valence of M. Since the propellant composition is required to withstand high temperature storage, it is preferable that the melting point and the decomposition temperatures of the oxidizer be as high as possible. The perchlorates of the Group I-A, Group I-B, and Group II-A metals are found to have the required high temperature stability and are employed in the preparation of propellant compositions by the process of this invention. Hence, the metal perchlorates used in the preparation of the propellant compositions include lithium perchlorate, sodium perchlorate, potassium perchlorate, rubidium perchlorate, and cesium perchlorate which are the perchlorates of the metals of Group I-A of the Periodic Table of Elements; silver perchlorate which is a perchlorate of the Group I-B metal; and magnesium perchlorate, calcium perchlorate, strontium perchlorate, and barium perchlorate which are the perchlorates of the Group II-A metals. In addition to the metal perchlorates, the compound ammonium perchlorate finds extensive use in propellant compositions. Examples of the nitrates of the Group I-A, and I-B and II-B which are employed in preparing propellant compositions by the process of this invention are compounds such as lithium nitrate, sodium nitrate, potassium nitrate, magnesium nitrate, calcium nitrate, barium nitrate, strontium nitrate, etc. Ammonium nitrate is also used.

The ratio of total solids-to-polymeric binder material in a propellant falls in the range of from about 1:1 to about 9:1 with an optimum ratio of about 8.5:1.5.

The strontium carbonate, calcium citrate or both are normally added to the matrix material in the preparation of the propellant grain. Additionally added to the matrix is the metal fuel either in the form of the ground particles or the wire reinforcing as disclosed in the previously mentioned co-pending applications. The metal or metal alloy fuel preferably contains predominately one or more of the metals of Groups I-A, II-A, III-A and Groups I-B through VII-B and Group VIII of the Periodic Table. Thus, the metal may be of Group I-A elements such as lithium; Group II-A metals such as beryllium or magnesium; Group III-A metals as aluminum; the metals of Group I-B through VII-B including copper, silver, zinc, cadmium, titanium, zirconium, vanadium, miobium, chromium, molybdenum, tungsten, manganese, iron, cobalt, nickel, ruthenium, rhodium, osmium, palladium and platinum.

It is also preferable to employ metals of relatively low molecular weight which give low molecular weight combustion products. Preferred metals for inclusion in the matrix include aluminum, beryllium, lithium and these metals alloyed with higher strength materials where required.

To indicate the affectiveness of the additives disclosed on the control of the burning rate, batches of propellant were prepared having the strontium carbonate therein. The propellant was made according to the following process. The mixer temperature was set to between 165° and 175°F. When the temperature reached the desired level, the liquid rubber binder and the plasticizer, if one is used, were weighed and then added to the mixer. Next, the oxidizers and the instant burning rate additives were weighed and added to the mixer. The mixer is then started and the product is mixed for approximately two minutes. Vacuum is then connected to the mixer and the mix is then continuously mixed for an additional eight minutes. The mixer is at this point stopped and the curative utilized is added to it and mixing is continued for an additional two minutes. It is this period of time the product temperature in the mixer is not permitted to exceed 175°F. The mixer is then stopped and the sides are scraped down and 10–15 inches of vacuum is applied for 3–5 seconds. A full vacuum of minimum 28 inches is then applied to the mixer and the material is mixed for an additional 10 minutes with the product temperature being held between 160° and 170°F. At the end of this period the material is ready for casting. The mixes made for the following tables were done in a two-and-one-fourth gallon (6,000 grams total weight) Baker-Perkins mixer.

EXAMPLE I

To determine the affect of the strontium carbonate on the burning rate of the propellants, liquid castable strands were prepared by obtaining a sample of the mix directly from the mixer and placing them in a caulking gun. The propellant was then extruded into straws which had been previously restricted with an adhesive restrictor material. The straws utilized had a six mm. inside diameter and were two-and-one-half inches in length. The straw containing the propellant was then burned on a Crawford or Atlantic Research Strand Bond. After the burning rates were determined in this manner, as indicated in the Table below, the propellant was cast or wound into various sized motors and fired. The burning rate data obtained from burning the strands was completely substantiated by the firings of the larger motors. In the Table below the ingredients are expressed in weight percentage. The mixes for the formulations used were approximately 6,000 grams per mix. The plasticizer utilized was either Conoco H-25 made by Continental Oil Company or ZP-211 which is butyl carbitol formal made by Thiokol Chemical Corporation or a mixture of the two. The curative utilized was MAPO which is tris[1-(2 -methyl)-aziridinyl] phosphine oxide.

As can be seen from the above Table, the strontium carbonate substantially lowered the burning rate of the matrix. At three and five weight percent based on the total weight of the matrix, the burning rate of the material was nearly decreased in half. Not only would the strontium carbonate affect the burning rate, but as can be readily seen by the data that was obtained, the physical properties of the material were greatly improved. Significant improvement is particularly seen in the modulus elastivity of the material and the tensile strength. This improvement in the physical properties of the grain was much different than that experienced before since most previous burning rate additives have deleteriously affected the physical properties of the grain rather than actually improving them.

EXAMPLE II

A six-inch reinforced grain was prepared using the strontium carbonate burning rate modifier. The composition of the grain was 9.5 weight percent binder, 83.6 percent ammonium perchlorate, 1.9 weight percent strontium carbonate and five weight percent aluminum wire. The burning rate of the strand of matrix alone without aluminum wire was previously determined from a test to be 0.198 inch per second at 1000 psia. The burning rate of the instant six-inch grain was 0.230 inch per second. This grain was fired at a pressure of 650 psia. The specific impulse calculated on the basis of 1000 psia was 248 lb-sec per pound. These results indicate that in final grain with the aluminum wire present a low burning rate is obtained with a high spe-

TABLE I

LOW BURNING RATE MATRIX PROPELLANTS WITH VARIOUS LEVELS OF BURNING RATE DEPRESSANTS

| Formulation Number | 1 | 2 | 3 | 4 | 5 | 6 | 7 |
|---|---|---|---|---|---|---|---|
| Ingredients, Wt. Percent | | | | | | | |
| Butarez CTL | 11.97 | 11.97 | 11.97 | 11.92 | 11.92 | 11.92 | 11.92 |
| Curative | 0.24 | 0.24 | 0.24 | 0.29 | 0.29 | 0.29 | 0.29 |
| Plasticizer | 1.79 | 1.79 | 1.79 | 1.79 | 1.79 | 1.79 | 1.79 |
| Total Binder | 14.00 | 14.00 | 14.00 | 14.00 | 14.00 | 14.00 | 14.00 |
| Burning Rate Modifier | | | | | | | |
| Strontium carbonate | — | 3.0 | 5.00 | 0.50 | 1.00 | 2.00 | 1.50 |
| Ammonium perchlorate | | | | | | | |
| 400 $\mu$ | 30.10 | 30.10 | 30.10 | 30.10 | 30.10 | 30.10 | 30.10 |
| 200 $\mu$ | 30.10 | 30.10 | 30.10 | 30.10 | 30.10 | 30.10 | 30.10 |
| Fines (9100 rpm grind of Pennsalt) | 25.80 | 22.80 | 20.80 | 25.30 | 24.80 | 23.80 | 24.30 |
| Strand Burning Rate, r, in.-sec. at 1015 psia | 0.336 | 0.184 | 0.180 | 0.263 | 0.222 | 0.199 | 0.215 |
| Mechanical Properties at 77F | | | | | | | |
| Elongation, $e_m$, percent | 31 | — | — | 31 | 27 | 31 | |
| Tensile, $S_m$, psi | 90 | — | — | 128 | 133 | 143 | |
| Modulus, E, psi | 429 | — | — | 681 | 779 | 728 | |

H-25 is comprised of an alkyl-aryl hydrocarbon mixture which is highly saturated having a flash point of 325°F, a distillation range of 613°–722°F, a bromine number of 0.32, a specific gravity at 60°F of 0.88 and a viscosity at 100°F of 21 centipoises.

cific impulse.

The following Table II illustrates the improved results obtained from using calcium citrate as a burning rate modifier. As can be seen, significant improvement in the reduction of the burning rate is obtained as well as improvement in the physical properties of the propellant matrix.

low burning rates can be obtained by utilizing the combination of the two additives but additionally, relatively

TABLE II

LOW BURNING RATE MATRIX PROPELLANTS WITH VARIOUS LEVELS OF BURNING RATE DEPRESSANTS

| Formulation Number | 1 | 2 | 3 | 4 | 5 | 6 | 7 |
|---|---|---|---|---|---|---|---|
| Ingredients, Wt. Percent | | | | | | | |
| Butarez CTL | 11.97 | 11.97 | 11.97 | 11.92 | 11.92 | 11.92 | 11.97 |
| Curative | 0.24 | 0.24 | 0.24 | 0.29 | 0.29 | 0.29 | 0.24 |
| Plasticizer | 1.79 | 1.79 | 1.79 | 1.79 | 1.79 | 1.79 | 1.79 |
| Total Binder | 14.00 | 14.00 | 14.00 | 14.00 | 14.00 | 14.00 | 14.00 |
| Additive | | | | | | | |
| Calcium Citrate | — | 3.00 | 5.00 | 0.50 | 1.00 | 4.00 | 8.00 |
| Ammonium Perchlorate | | | | | | | |
| 400$\mu$ | 30.10 | 30.10 | 30.10 | 30.10 | 30.10 | 30.10 | 30.10 |
| 200$\mu$ | 30.10 | 30.10 | 30.10 | 30.10 | 30.10 | 30.10 | 30.10 |
| Fines (9100 rpm grind of 200 Pennsalt) | 25.80 | 22.80 | 20.80 | 25.30 | 24.80 | 21.80 | 17.80 |
| Strand Burning Rate, r, in.-sec. at 1015 psia | 0.336 | 0.254 | 0.169 | 0.320 | 0.276 | 0.192 | 0.163 |
| Mechanical Properties at 77F | | | | | | | |
| Elongation, $e_m$, percent | 31 | 32 | 20 | 24 | 29 | 21 | 22 |
| Tensile, $S_m$, psi | 90 | 60 | 50 | 120 | 100 | 64 | 19 |
| Modulus, E, psi | 429 | 279 | 360 | 633 | 529 | 493 | 140 |

EXAMPLE III

The FIGURE plots the results obtained from burning a propellant strand having a combination of both a strontium carbonate and calcium citrate as burning rate modifiers. The plot shows the results obtained from burning both of the modifiers as compared to the results of burning each individually. The strands burned were done so as described previously with relation to the results obtained in Tables I and II. As can be seen, the strontium carbonate and calcium citrate combination was present at the level of five weight percent of the composition. The formulation utilized to obtain the results had 82.5 weight percent ammonium perchlorate and a total binder content of 13.5 weight percent of the total binder in addition to the five weight percent of the burning rate modifiers. As can be seen, synergistic results are obtained when both modifiers are present. The combination of the two modifiers produces lower burning rates than at all obtainable from using either of the two separately.

EXAMPLE IV

To determine the motor burning rate and impulse at low pressures, two six-inch reinforced grains were fabricated with matrix propellant containing the combination of the two additives for a total additive level of five percent. The first grain contained 16 weight percent aluminum wire and a matrix propellant of 1.5 weight percent strontium carbonate and 3.5 weight percent calcium citrate. The second grain contained 18.6 weight percent aluminum wire and a matrix propellant with three weight percent strontium carbonate and two weight percent calcium citrate. The following Table III indicates the results obtained.

TABLE III

| GRAIN NO. | 1. | 2. |
|---|---|---|
| Chamber pressure, $P_b$ avg. psia | 580 | 615 |
| Burning rate at $P_b$, in.-sec. | 0.166 | 0.182 |
| Impulse, del, lb.-sec./lb. | 203.2 | 205.9 |
| Impulse at 1000 psia, $I°_{sp}$, lb.-sec./lb. | 218.9 | 220.1 |

The results of the above Table III indicate that not only high impulses are derived. Unlike most previous burning rate modifiers known, the combination of this invention does not appear to greatly adversely affect the impulse of the solid propellant. The impulse for a similar grain without the additives is approximately 230 lb.-sec./lb.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A solid propellant matrix having therein the combination of calcium citrate and strontium carbonate in sufficient quantity to reduce the burning rate of the propellant.

2. The composition of claim 1 wherein said combination is present in the amount of from 0.5 to 9 weight percent of said matrix.

3. The composition of claim 1 wherein the combination is present from 4 to 6 weight percent of the matrix.

4. A solid propellant matrix composition having therein a compound selected from the class consisting of strontium carbonate and calcium citrate in sufficient quantity to reduce the burning rate of the propellant.

5. The composition of claim 3 wherein said compound is from 0.5 to 9 weight percent of the matrix.

6. A solid propellant matrix composition having therein from 2 to 3.5 weight percent strontium carbonate.

7. A solid propellant matrix composition having therein from 4 to 5.5 weight percent calcium citrate.

8. A solid propellant comprising:
a matrix of a binder, curative and oxidizer,
a metallic fuel disposed in said matrix,
and the combination of calcium citrate and strontium carbonate in sufficient quantity to reduce the burning rate of the propellant.

9. A solid propellant comprising:
a matrix of a binder, curative and oxidizer,
a metallic fuel disposed in said matrix, and a compound selected from the class consisting of strontium carbonate and calcium citrate in sufficient quantity to reduce the burning rate of the propellant.

* * * * *